United States Patent [19]
Gilmore et al.

[11] Patent Number: 5,835,847
[45] Date of Patent: Nov. 10, 1998

[54] PILOT SIGNAL STRENGTH CONTROL FOR A LOW EARTH ORBITING SATELLITE COMMUNICATIONS SYSTEM

[75] Inventors: Robert P. Gilmore, San Diego; James H. Thompson, Carlsbad, both of Calif.

[73] Assignee: Qualcomm Incorporated, San Diego, Calif.

[21] Appl. No.: 627,830

[22] Filed: Apr. 2, 1996

[51] Int. Cl.⁶ .............................. H04B 7/185; H04B 7/00
[52] U.S. Cl. .......................... 455/12.1; 455/13.4; 455/69
[58] Field of Search .................. 455/12.1, 13.4, 455/33.1, 54.1, 67.1, 63, 69, 422, 517, 427

[56] References Cited

U.S. PATENT DOCUMENTS

| | | | |
|---|---|---|---|
| 4,228,538 | 10/1980 | Scharla-Nielsen et al. | 455/13.4 |
| 4,910,792 | 3/1990 | Takahata et al. | 455/12.1 |
| 5,574,984 | 11/1996 | Reed et al. | 455/69 |
| 5,619,525 | 4/1997 | Wiedeman et al. | 455/13.4 |

FOREIGN PATENT DOCUMENTS

| | | | |
|---|---|---|---|
| 5312141 | 10/1978 | Japan | H04B 7/15 |
| 5513314 | 10/1980 | Japan | H04B 7/14 |
| 8603081 | 5/1986 | WIPO | H04B 7/185 |
| 9109473 | 6/1991 | WIPO | H04B 7/185 |
| 9309626 | 5/1993 | WIPO | H04L 27/30 |

OTHER PUBLICATIONS

Shunichiro Egami et al., "Improvement of K–Band Satellite Link Transmission Capacity and Availability by the Transmitting Power Control", *Electronics & Communications in Japan*, vol. 66–B, No. 12, 1983, pp. 80–89.

Primary Examiner—Edward F. Urban
Assistant Examiner—Sam Bhattacharya
Attorney, Agent, or Firm—Russell B. Miller; Gregory D. Ogrod

[57] ABSTRACT

A system and method for controlling the strength of a shared resource signal transmitted by the satellite transponder in a satellite communications system. The satellite communications system includes a gateway for transmitting communications signals including a shared resource signal, a satellite transponder for relaying the signals to at least one subscriber unit (for example, a phone), and at least one subscriber unit for receiving the signals. The method includes the steps of receiving the shared resource signal, at each subscriber unit, via the satellite transponder; measuring, at each subscriber unit, a signal strength for the received shared resource signal; sending the signal strengths to the gateway; and adjusting the power of the shared resource signal transmitted by the satellite transponder based on the signal strengths.

6 Claims, 4 Drawing Sheets

PILOT SIGNAL STRENGTH CONTROL FOR A LOW EARTH ORBITING SATELLITE COMMUNICATIONS SYSTEM

BACKGROUND OF THE INVENTION

1. Field of the Invention

The present invention relates to multiple access communications systems, such as wireless data or telephone systems, and satellite repeater type spread-spectrum communications systems. More particularly, the invention relates to a system and method for controlling the signal strength of shared resource signals such as pilot signals in a satellite communications system.

2. Description of the Related Art

A variety of multiple access communications systems have been developed for transferring information among a large number of system users. Two known techniques employed by such multiple access communications systems include time division multiple access (TDMA) and frequency division multiple access (FDMA), the basics of which are well known in the art. However, spread-spectrum modulation techniques, such as code division multiple access (CDMA) spread-spectrum techniques, provide significant advantages over the other modulation schemes, especially when providing service for a large number of communications system users. The use of CDMA techniques in a multiple access communications system is disclosed in the teachings of U.S. Pat. No. 4,901,307, which issued Feb. 13, 1990, under the title "Spread Spectrum Multiple Access Communication System Using Satellite Or Terrestrial Repeaters," and U.S. Pat. No. 5,691,974 issued Nov. 25, 1997, under the title "*Method And Apparatus For Using Full Spectrum Transmitted Power In A Spread Spectrum Communication System For Tracking Individual Recipient Phase Time And Energy*," which are both assigned to the assignee of the present invention, and are incorporated herein by reference.

The above-mentioned patent documents disclose multiple access communications systems in which a large number of generally mobile or remote system users (hereinafter referred to as subscribers) each employ at least one subscriber unit to communicate with other system subscribers or users of other connected systems, such as a public telephone switching network. The subscriber units communicate through gateways and satellite repeaters using CDMA spread-spectrum type communications signals.

Satellites form beams which illuminate a "spot" produced by projecting satellite communications signals onto the Earth's surface. A typical satellite beam pattern for a spot comprises a number of beams arranged in a predetermined coverage pattern. Typically, each beam comprises a number of so-called sub-beams covering a common geographic area, each occupying a different frequency band.

In a typical spread-spectrum communications system, a set of preselected pseudorandom noise or pseudonoise (PN) code sequences is used to modulate (i.e., "spread") information signals over a predetermined spectral band prior to modulation onto a carrier signal for transmission as communications signals. PN spreading, a method of spread-spectrum transmission that is well known in the art, produces a signal for transmission that has a bandwidth much greater than that of the data signal. In the gateway-to-subscriber communications link, PN spreading codes or binary sequences are used to discriminate between signals transmitted by a gateway over different beams, as well as between multipath signals. These codes are typically shared by all communications signals within a beam.

In a typical CDMA spread-spectrum system, channelizing codes are used to discriminate between subscriber signals transmitted within a satellite beam on the forward link (i.e., the link from the gateway to the subscriber unit). That is, each subscriber unit has its own orthogonal channel (hereinafter referred to as a "traffic channel") provided on the forward link by using a unique "channelizing" orthogonal code. Walsh functions are generally used to implement the channelizing codes, with a typical length being on the order of 64 code chips for terrestrial systems and 128 code chips for satellite systems.

Typical CDMA spread-spectrum communications systems, such as disclosed in U.S. Pat. No. 4,901,307, contemplate the use of coherent modulation and demodulation for forward link subscriber unit communications. In communications systems using this approach, a "pilot" carrier signal (hereinafter referred to as a "pilot signal") is used as a coherent phase reference for gateway-to-subscriber links. That is, a pilot signal, which typically contains no data modulation, is transmitted by a gateway throughout a region of coverage. A single pilot signal is typically transmitted by each gateway for each frequency used. These pilot signals are shared by all subscribers receiving signals from that source.

Since pilot signals do not typically involve data modulation, they essentially consist of PN spreading codes which are modulated onto a carrier frequency. Pilot signals can use the same PN spreading code throughout the communications system but with different relative code timing offsets for each beam. This provides signals that can be readily distinguished from each other while providing simplified acquisition and tracking. Alternatively, each pilot signal may be generated using a different PN code.

Pilot signals are used by subscriber units to obtain initial system synchronization and time, frequency, and phase tracking of transmitted signals. Phase information obtained from tracking a pilot signal carrier is used as a carrier phase reference for coherent demodulation of other system or traffic signals. This technique allows many subscriber signal carriers to share a common pilot signal as a phase reference, providing for a less costly and more efficient tracking mechanism.

In a satellite communications system, the amount of power available for signal transmission is limited by the power-generating capacity of the satellite. To optimize the use of this power, it must be allocated between traffic signals and pilot signals carefully. If too little power is allocated to the pilot signal, the subscriber units cannot accumulate sufficient energy to synchronize their receivers with the gateway. Conversely, if too much pilot signal power is transmitted, the amount of power available for traffic signals, and, thus, the number of subscribers that can be supported, is reduced. Therefore, to maximize the subscriber capacity on the satellite, the amount of pilot signal power transmitted must be accurately controlled.

In addition to pilot signals, there are other shared resources that can be used in communication systems. Paging signals are used to transmit system overhead information and subscriber unit specific messages to subscriber units. A communication system may have several paging signals. Synchronization signals can also be used to transfer system information useful to facilitate time synchronization. All of these signals act as shared resources in a manner similar to pilot signals. Such signals also impact power consumption in satellite or other power-limited or power-controlled communication systems. In addition, it is desirable to minimize the amount of energy present in these signals to decrease interference, and to increase system capacity.

What is needed, therefore, is a method and apparatus for controlling the signal strength for shared resource signals such as a pilot signal in a satellite communications system to maximize the number of subscribers supported.

SUMMARY OF THE INVENTION

The present invention is a system and method for controlling the signal strength of a shared resource signal in a satellite communications system. For example, the shared resource signal may be a paging signal or a synchronization signal. In a preferred embodiment, the shared resource signal is a pilot signal transmitted on the forward link via a low earth orbiting (LEO) satellite. The forward link is the communication path originating at the gateway and terminating at the subscriber unit. Pilot signals represent a shared resource used by the subscriber units for time, frequency, and phase synchronization.

In a preferred embodiment of the present invention, the satellite communications system comprises a gateway for transmitting communications signals including a shared resource signal, a satellite transponder for relaying the signals to at least one subscriber unit (e.g., a phone), and at least one subscriber unit for receiving the signals. The method comprises the steps of receiving the shared resource signal, at each subscriber unit, via the satellite transponder; measuring, at each subscriber unit, a signal strength for the received shared resource signal; sending the measured signal strengths to the gateway; and adjusting the strength of the shared resource signal transmitted by the satellite transponder based on the measured signal strengths. In a preferred embodiment of the present invention, the strength of the received shared resource signal is measured by determining its signal-to-noise ratio.

In a further aspect of the invention, the signal-to-noise ratios are used to compute the signal flux density for the shared resource signal being received by the subscriber units. The determined signal flux density is used as a basis for adjusting the shared resource signal power so as to radiate a selected subscriber unit with a predetermined level of flux density. The selected subscriber is generally referred to as a clear path subscriber, and the predetermined flux density level is selected to provide such a subscriber unit with a desired margin for communication signal quality.

In a further embodiment, there are several clear path subscribers, and two or more such subscribers are used to establish the average flux density value to be used as the basis for adjusting signal power. The average flux density determined for each of the subscribers in group of clear path subscribers can be time averaged over the group to establish a desired single reference value.

One advantage of the preferred embodiment of the present invention is that it permits accurate closed-loop control of the shared resource signal strength in a satellite communications system.

Further features and advantages of the present invention as well as the structure and operation of various embodiments of the present invention are described in detail below with reference to the accompanying drawings.

BRIEF DESCRIPTION OF THE DRAWINGS

The invention is best understood by reference to the Figures wherein like reference numbers indicate identical or functionally similar elements. In addition, the left-most digit of the reference number refers to the figure in which the reference number first appears in the accompanying drawings.

DETAILED DESCRIPTION OF THE PREFERRED EMBODIMENTS

Figure 1:
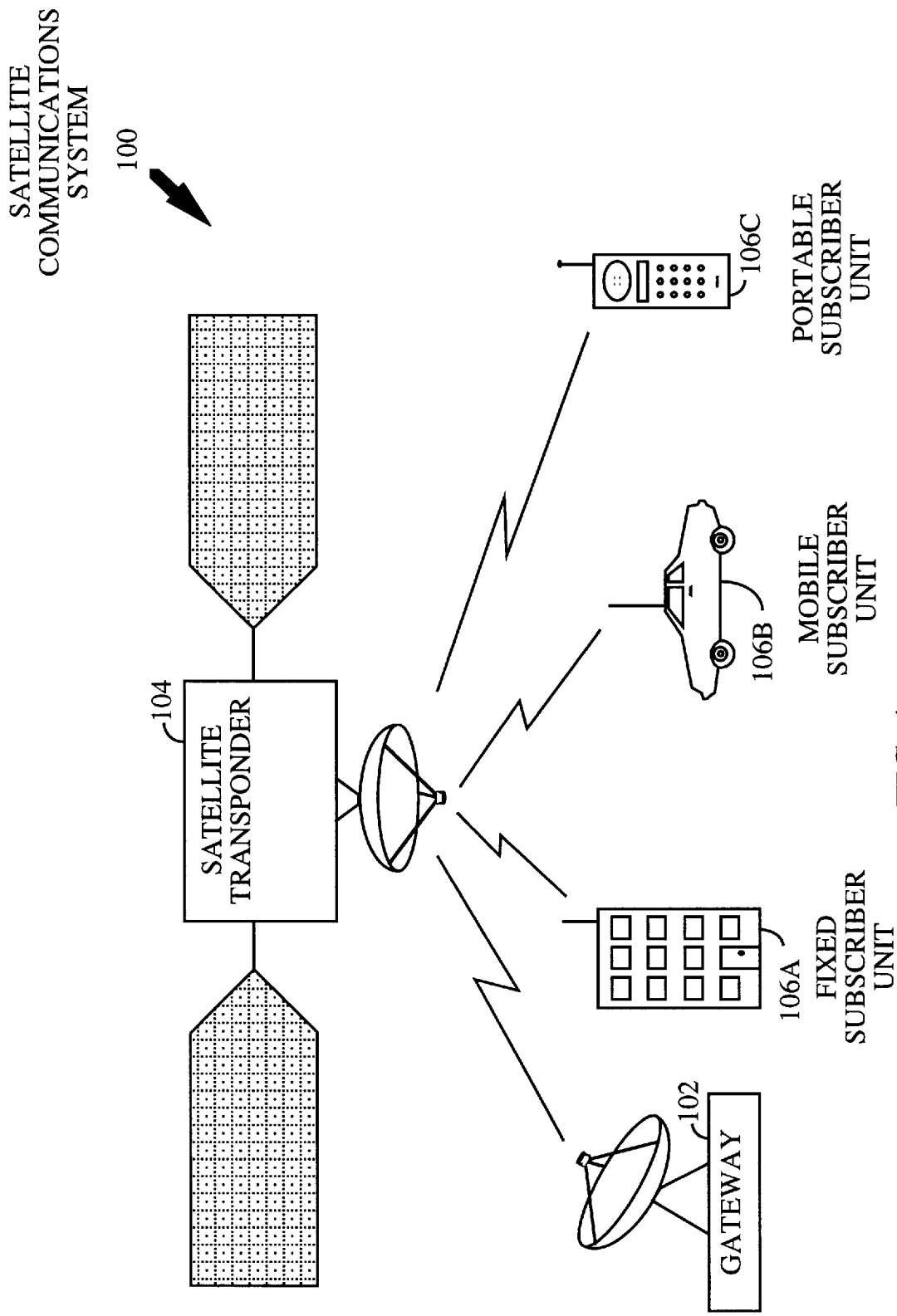
FIG. 1 depicts a typical satellite communication system.

The present invention is a system and method for controlling the signal strength of a shared resource signal in a satellite communications system. A shared resource signal may be, for example, a paging signal or a synchronization signal. In a preferred embodiment of the present invention, the shared resource signal is a pilot signal transmitted on the forward link via a low earth orbiting (LEO) satellite. The forward link is the communications path originating at the gateway and terminating at the subscriber unit. A pilot signal represents a shared resource used by subscriber units for time, frequency, and phase synchronization. Other shared signals, such as paging and synchronization signals, can be used to inform subscriber units of desired communications, transfer overhead information, and provide time synchronization.

While specific steps, configurations and arrangements are discussed, it should be understood that this is done for illustrative purposes only. A person skilled in the relevant art will recognize that other steps, configurations and arrangements can be used without departing from the spirit and scope of the invention.

In a typical CDMA spread-spectrum communications system, such as a wireless data or telephone system, base stations within predefined geographical regions (also known as cells) each use modulator and demodulator units or spread-spectrum modems to process communications signals for system subscribers. Each spread-spectrum modem generally employs a digital spread-spectrum transmission modulator, at least one digital spread-spectrum data receiver and at least one searcher receiver. During typical operations, a modem in a base station is assigned to each subscriber or subscriber unit as needed to accommodate transfer of communications signals with the assigned subscriber. Multiple receivers can be used to accommodate diversity processing. For communications systems employing satellite transponders, receivers, modulators, and transmitters are generally placed in base stations referred to as gateways that communicate with subscribers by transferring signals via the satellite transponders. There may be other associated control centers that communicate with the satellites or gateways to maintain system-wide traffic control and signal synchronization.

Exemplary spread-spectrum type communications systems, such as those discussed in the above-mentioned patent documents, use a waveform based on a direct sequence pseudorandom noise spread-spectrum carrier. That is, a baseband carrier is modulated using a pseudonoise (PN) binary sequence, or pair of sequences, to achieve a desired spreading effect. PN codes are used to spread the spectrum of all communications signals transmitted over gateway-to-subscriber links to discriminate between signals transmitted by the gateway over different beams, and to discriminate between multipath signals. Such PN sequences are sometimes referred to as "spreading" codes.

Each PN sequence consists of a series of "chips" occurring over a preselected PN code period at a frequency much higher than the baseband communications signal being spread. An exemplary chip rate for satellite systems is around 1.2288 MHz with a PN code sequence length of 1024 chips. However, the present invention is also useful with other chip rates and code lengths, as will be apparent to those skilled in the relevant art. For instance, some terrestrial cellular systems use spreading codes having $2^{15}$=32,678 chips. Each communications system design specifies the type and distribution of spreading codes within a communications system according to factors well known in the art. An exemplary generation circuit for these sequences is disclosed in U.S. Pat. No. 5,228,054 entitled "*Power Of Two Length Pseudo-Noise Sequence Generator With Fast Offset Adjustments*," issued Jul. 13, 1993, which is assigned to the assignee of the present invention, and is incorporated herein by reference.

A single PN code sequence, or pair of sequences, is generally employed for the spreading function in a communications system. Signals for different beams are generally differentiated by providing different time offsets of the basic PN code sequence for each beam relative to its neighbors. That is, subscriber units operating within the service area of a given beam share a single PN spreading code time offset, while other beams use different offsets of the same PN code. The basic signal timing established by each gateway for subscribers being served on a given frequency is the same. Alternatively, beams can be differentiated by providing different PN code sequences for each beam.

Information signals to be transferred to system subscribers are generally digitized as necessary, and encoded and interleaved as desired, to create a basic digital communications signal. Signals addressed to specific subscribers are also modulated by an additional distinct orthogonal spreading function assigned to that subscriber's forward link. That is, a unique orthogonal code sequence is used to distinguish between different subscriber signals within a cell or beam. Such orthogonal sequences are sometimes referred to as channelizing codes, and are typically applied prior to the final PN spreading codes discussed above. This coding on the forward link of a given carrier frequency produces subscriber signals also referred to as traffic signals.

The resulting PN-spread and orthogonally-encoded output signals are then typically bandpass-filtered and modulated onto an RF carrier. This is typically accomplished by bi-phase modulating a quadrature pair of sinusoids that are summed into a single communications signal. The resulting signals may be further amplified and filtered before being summed with other forward link signals and radiated by an antenna for the gateway. The filtering, amplification, and modulation operations are well understood in the art. Additional details on the operation of this type of transmission apparatus are found in U.S. Pat. No. 5,103,459, issued Apr. 7, 1992, entitled "*System And Method For Generating Signal Waveforms In A CDMA Cellular Telephone*," which is assigned to the assignee of the present invention, and is incorporated herein by reference.

One type of orthogonal channelizing code is the Walsh code, which is employed in a preferred embodiment of the present invention. The derivation of Walsh codes is disclosed in U.S. Pat. No. 5,103,459 entitled "*System And Method For Generating Signal Waveforms In A CDMA Cellular Telephone System*," which is assigned to the assignee of the present invention, and is incorporated herein by reference.

As mentioned above, each gateway in current CDMA spread-spectrum type wireless or cellular telephone systems transmits a "pilot" carrier signal (referred to herein as a "pilot signal"). Pilot signals are used by subscriber units to obtain initial system synchronization. The pilot signal contains no data modulation, and essentially represents the PN spreading functions, or codes, used by the communications system. Typically, each gateway transmits one pilot signal for each frequency used. Each pilot signal is shared by all subscribers receiving traffic signals from that gateway at a particular frequency.

One of the key constraints in a satellite communications system is that the amount of power available on the satellite for signal transmission is severely limited. For this reason, the signal strength of each traffic signal is individually controlled to minimize the satellite power consumed while still maintaining acceptable traffic signal quality. But when controlling the signal strength of a shared resource signal such as a pilot signal, all of the users sharing the resource must be considered collectively.

For satellite repeater systems, the pilot signal is transferred within each satellite beam frequency and originates with gateways according to the satellite or satellite beam being used for communications links. However, pilot signals can also be transmitted as shared resources over various combinations of beams and sub-beams, using a variety of satellites, gateways, or base stations, as would be apparent to one skilled in the relevant art. The teachings of the present invention are not limited to a specific pilot transmission scheme in a communications system, nor by the type of shared resource being used.

Typically, each pilot signal within a communications system is generated using the same PN code with different code timing offsets. Alternatively, each pilot signal may be generated using a different PN code. This provides signals that can be readily distinguished from each other, while providing simplified acquisition and tracking. Other signals are used to transmit spread-spectrum modulated information, such as gateway identification, system timing, subscriber paging information, and various other control signals.

In a satellite communications system, the amount of power available for signal transmission is limited by the power-generating capacity of the satellite. To optimize the use of this power, it must be allocated between traffic signals and pilot signals carefully. If too little power is allocated to the pilot signal, the subscriber units cannot accumulate sufficient energy to synchronize their receivers with the gateway. Conversely, if too much pilot signal power is transmitted, the amount of power available for traffic signals, and thus the number of subscribers that can be supported, is reduced. Therefore, to maximize the subscriber capacity on the satellite, the amount of pilot signal power transmitted must be accurately controlled.

One approach to solving this problem is open loop pilot signal power control. In this approach, the gateway makes an open loop estimate of the path gain in the forward link, i.e., from the modulator in the gateway, via the satellite transponder, to the subscriber unit. The gateway uses this estimate to control the pilot signal power transmitted by the gateway, and, thus, to control the pilot signal power transmitted by the satellite transponder. A significant problem with this approach is that this open loop estimate will contain errors due to the uncertainties of the path gain, including uncertainties in the satellite transponder electronic gain, gain compression of the satellite transponder high power amplifiers, antenna gain and path loss due to atmospheric effects such as rain attenuation. The error due to these gain uncertainties can be quite large.

A second approach to pilot signal power control is partial closed loop pilot signal power control. In this approach, a measuring device, typically a calibrated subscriber unit, is co-located at the gateway. The calibrated subscriber unit measures the received pilot signal strength and forwards it to the gateway control processor. The gateway uses this estimate to control the pilot signal power transmitted by the gateway, and, thus, controls the pilot signal power transmitted by the satellite transponder. However, these measurements will be unreliable for at least two reasons. First, should the beam illuminating the gateway fail, the gateway cannot close the loop. Second, measurements made for the single beam illuminating the gateway may not accurately reflect pilot signal levels in other beams due to differences between beams or local subscriber environment and path loss. For example, the electronic gain may differ for different beams, or the beam illuminating the gateway may be subject to atmospheric effects that could result in a substantial measurement error. Thus, a single measurement taken at the gateway may not be as good a predictor of the level of interference at other locations as desired. In order to make reliable measurements to be used in closed loop pilot signal tracking, the pilot signal strength measurements should be distributed over the entire satellite coverage area.

In a preferred embodiment of the present invention, each subscriber unit measures the signal strength for the received pilot signal, or other shared resource signal, and transmits this information back to the gateway. In a preferred embodiment of the present invention, the strength of the received shared resource signal is measured by determining its signal-to-noise ratio. The subscriber units can be both uncontrolled users of the system and also strategically placed calibrated units or phones dedicated to performing pilot signal strength (or quality) measurement. The gateway control processor then uses these measurements to determine an appropriate level of pilot signal power for transmission.

FIG. 1 depicts a typical satellite communication system 100. Satellite communication system 100 comprises gateway 102, satellite transponder 104, and subscriber units 106. Subscriber units 106 are generally of three types: fixed subscriber units 106A, which are typically mounted in permanent structures; mobile subscriber units 106B, which are typically mounted in vehicles; and portable subscriber units 106C, which are typically hand-held. Gateway 102 communicates with subscriber units 106 via satellite transponder 104.

Figure 2:
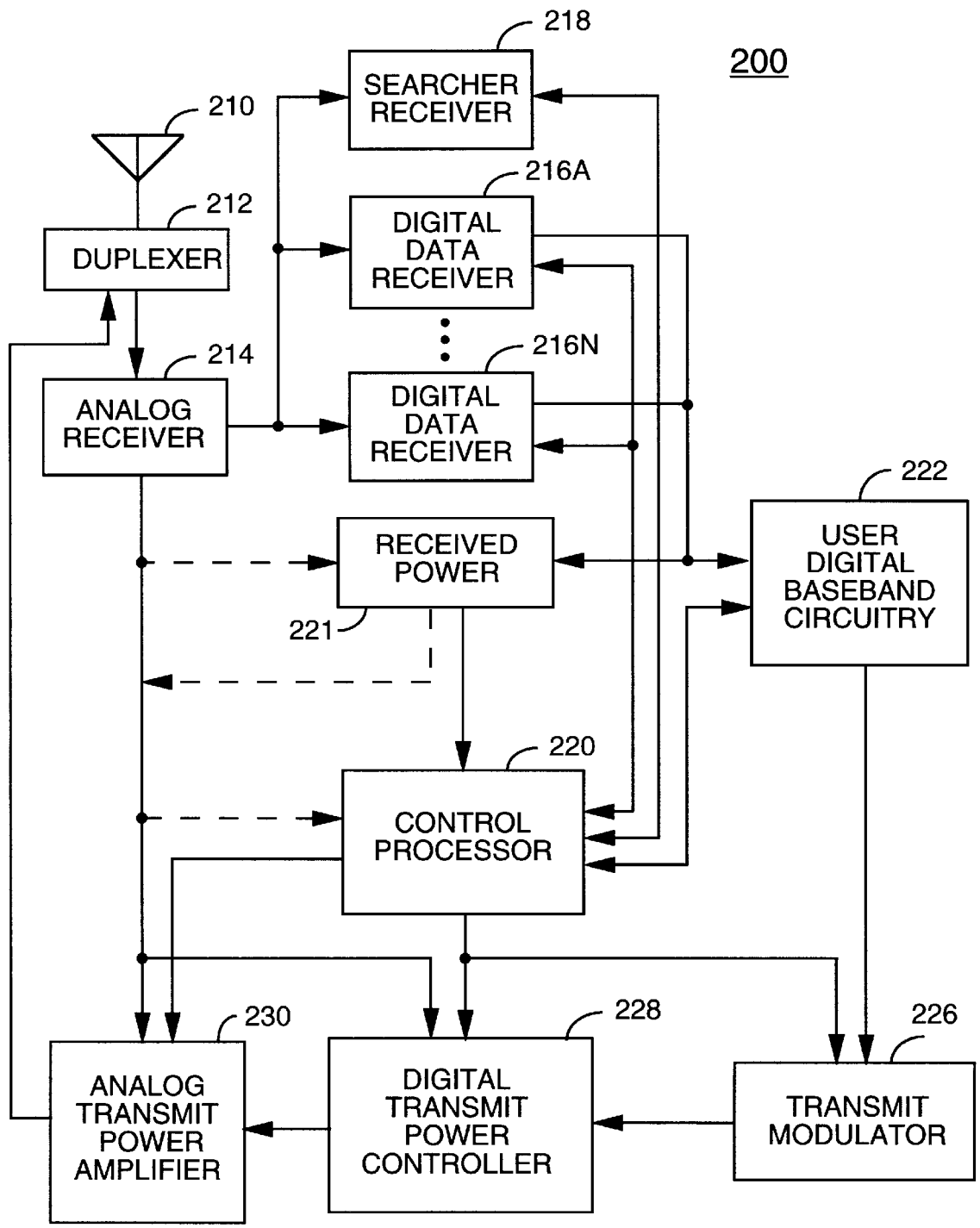
FIG. 2 is a block diagram of an exemplary transceiver 200 for use in a subscriber unit 106.

An exemplary transceiver 200 for use in a subscriber unit 106 is illustrated in FIG. 2. Transceiver 200 uses at least one antenna 210 for receiving communication signals which are transferred to an analog receiver 214, where they are downconverted, amplified, and digitized. A duplexer element 212 is typically used to allow the same antenna to serve both transmit and receive functions. However, some systems employ separate antennas for operating at different frequencies. The digital communication signals output by analog receiver 214 are transferred to at least one digital data receiver 216A and at least one searcher receiver 218. Additional digital data receivers 216B–216N can be used to obtain desired levels of signal diversity, depending on the acceptable level of unit complexity, as would be apparent to one skilled in the relevant art.

At least one control processor 220 is coupled to digital data receivers 216A–216N along with the searcher receiver 218. Control processor 220 provides, among other functions, basic signal processing, timing, power and handoff control or coordination. Another basic control function often performed by control processor 220 is the selection or manipulation of PN code sequences or orthogonal functions to be used for processing communication signal waveforms. Control processor 220 signal processing can include determination of relative signal strength and computation of various related signal parameters. In some embodiments, the computation of signal strength may include the use of additional or separate circuitry such as received power element 221 to provide increased efficiency or speed in measurements or improved allocation of control processing resources.

Outputs for digital data receivers 216A–216N are coupled to digital baseband circuitry 222 within the subscriber unit. User digital baseband circuitry 222 comprises processing and presentation elements used to transfer information to and from a subscriber unit user. That is, signal or data storage elements, such as transient or long term digital memory; input and output devices such as display screens, speakers, keypad terminals, and handsets; A/D elements, vocoders and other voice and analog signal processing elements; etc., all form parts of the subscriber baseband circuitry using elements well known in the art. If diversity signal processing is employed, user digital baseband circuitry 222 can comprise a diversity combiner and decoder. Some of these elements may also operate under the control of, or in communication with, control processor 220.

When voice or other data is prepared as an output message or communications signal originating with the subscriber unit, user digital baseband circuitry 222 is used to receive, store, process, and otherwise prepare the desired data for transmission. User digital baseband circuitry 222 provides this data to a transmit modulator 226 operating under the control of control processor 220. The output of transmit modulator 226 is transferred to a digital transmit power controller 228 which provides output power control to an analog transmit power amplifier 230 for final transmission of the output signal from antenna 210 to a gateway. Information on the measured signal strength for received communication signals or one or more shared resource signals can be sent to the gateway using a variety of techniques known in the art. For example, the information can be transferred as a data signal or be appended to other messages prepared by user digital baseband circuitry 222. Alternatively, the information can be inserted as predetermined control bits by transmit modulator 226 or transmit power controller 228 under control of control processor 220.

Analog receiver 214 can provide an output indicating the power or energy in received signals. Alternatively, received power element 221 can determine this value by sampling an output of analog receiver 214 and performing processing well known in the art. This information can be used directly by transmit power amplifier 230 or transmit power controller 228 to adjust the power of subscriber unit transmitted signals. This information can also be used by control processor 220.

Digital receivers 216A–N and searcher receiver 218 are configured with signal correlation elements to demodulate and track specific signals. Searcher receiver 218 is used to search for pilot signals, while digital receivers 216A–N are used to demodulate other signals (traffic) associated with detected pilot signals. Therefore, the outputs of these units can be monitored to determine the energy in the pilot signal or other shared resource signals. Here, this is accomplished using either received power element 221 or control processor 220.

Figure 3:
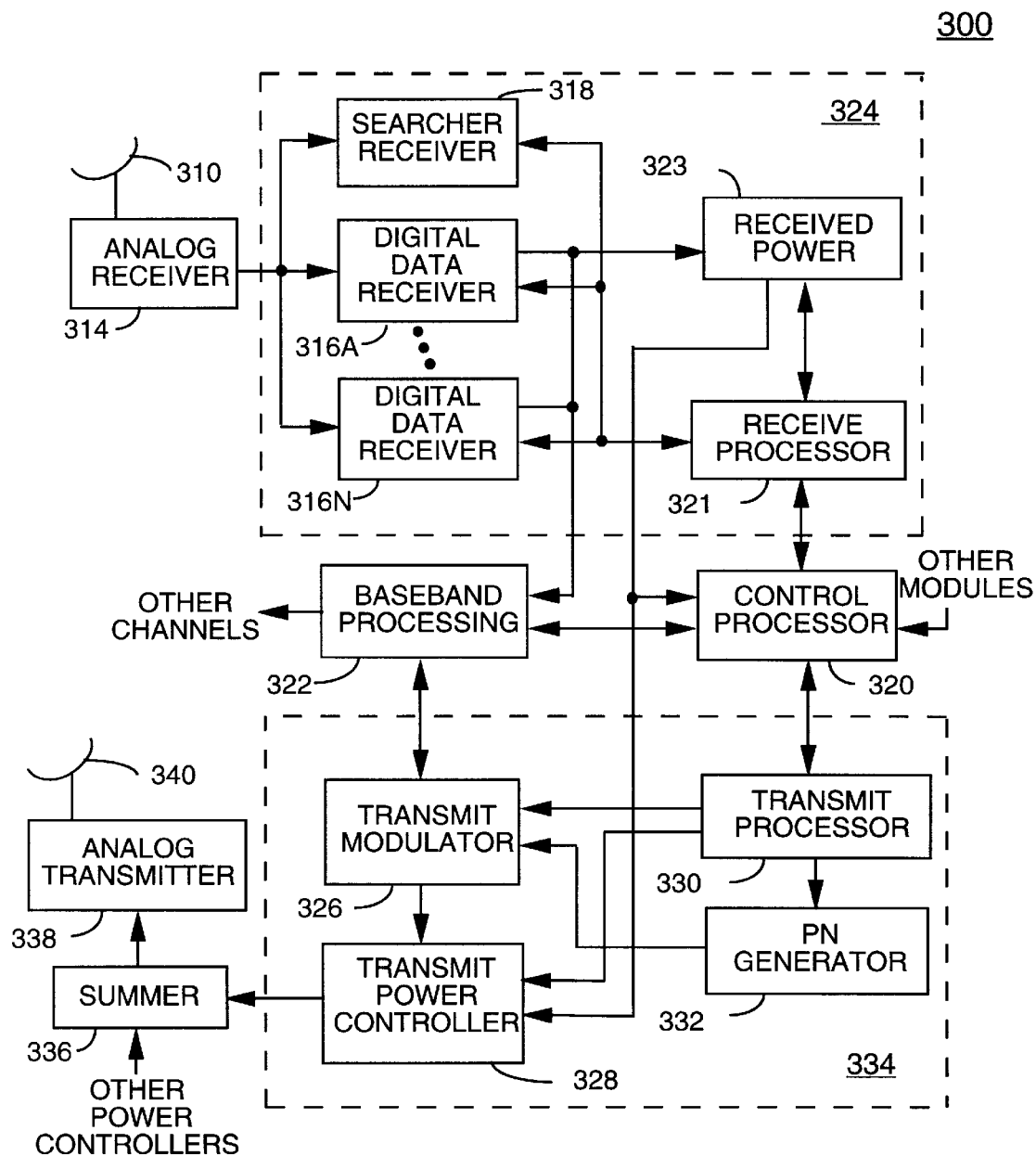
FIG. 3 is a block diagram of an exemplary transmission and reception apparatus 300 for use in a gateway 102.

An exemplary transmission and reception apparatus 300 for use in a gateway 102 is illustrated in FIG. 3. The portion of gateway 102 illustrated in FIG. 3 has one or more analog receivers 314 connected to an antenna 310 for receiving communication signals which are then downconverted, amplified, and digitized using various schemes well known in the art. Multiple antennas 310 are used in some communication systems. Digitized signals output by analog receiver 314 are provided as inputs to at least one digital receiver module, indicated by dashed lines generally at 324.

Each digital receiver module 324 corresponds to signal processing elements used to manage communications between one subscriber unit 106 and a gateway 102, although certain variations are known in the art. One analog receiver 314 can provide inputs for many digital receiver modules 324, and a number of such modules are typically used in gateways 102 to accommodate all of the satellite beams and possible diversity mode signals being handled at any given time. Each digital receiver module 324 has one or more digital data receivers 316 and a searcher receiver 318. Searcher receiver 318 generally searches for appropriate diversity modes of signals other than pilot signals. Where implemented in the communication system, multiple digital data receivers 316A–316N are used for diversity signal reception.

The outputs of digital data receivers 316 are provided to subsequent baseband processing elements 322 comprising apparatus well known in the art and not illustrated in further detail here. Exemplary baseband apparatus includes diversity combiners and decoders to combine multipath signals into one output for each subscriber. Exemplary baseband apparatus also includes interface circuits for providing output data, typically to a digital switch or network. A variety of other known elements such as, but not limited to, vocoders, data modems, and digital data switching and storage components may form a part of baseband processing elements 322. These elements operate to control or direct the transfer of data signals to one or more transmit modules 334.

Signals to be transmitted to subscriber units are each coupled to one or more appropriate transmit modules 334. A typical gateway uses a number of such transmit modules 334 to provide service to many subscriber units 106 at a time, and for several satellites and beams at a time. The number of transmission modules 334 used by gateway 102 is determined by factors well known in the art, including system complexity, number of satellites in view, subscriber capacity, degree of diversity chosen, and the like.

Each transmit module 334 includes a transmit modulator 326 which spread-spectrum modulates data for transmission. Transmit modulator 326 has an output coupled to a digital transmit power controller 328, which controls the transmission power used for the outgoing digital signal. Digital transmit power controller 328 applies a minimum level of power for purposes of interference reduction and resource allocation, but applies appropriate levels of power when needed to compensate for attenuation in the transmission path and other path transfer characteristics. A PN generator 332 is used by transmit modulator 326 in spreading the signals. This code generation can also form a functional part of one or more control processors or storage elements used in gateway 102.

The output of transmit power controller 328 is transferred to a summer 336 where it is summed with the outputs from other transmit power control circuits. Those outputs are signals for transmission to other subscriber units 106 at the same frequency and within the same beam as the output of transmit power controller 328. The output of summer 336 is provided to an analog transmitter 338 for digital-to-analog conversion, conversion to the appropriate RF carrier frequency, further amplification and output to one or more antennas 340 for radiating to subscriber units 106. Antennas 310 and 340 may be the same antennas depending on the complexity and configuration of the system.

At least one gateway control processor 320 is coupled to receiver modules 324, transmit modules 334, and baseband circuitry 322; these units may be physically separated from each other. Control processor 320 provides command and control signals to effect functions such as, but not limited to, signal processing, timing signal generation, power control, handoff control, diversity combining, and system interfacing. In addition, control processor 320 assigns PN spreading codes, orthogonal code sequences, and specific transmitters and receivers for use in subscriber communications.

Control processor 320 also controls the generation and power of pilot, synchronization, and paging channel signals and their coupling to transmit power controller 328. The pilot channel is simply a signal that is not modulated by data, and may use a constant-value or tone-type input to transmit modulator 326, effectively transmitting only the PN spreading codes applied from PN generator 332.

While control processor 320 can be coupled directly to the elements of a module, such as transmit module 324 or receive module 334, each module generally comprises a module-specific processor, such as transmit processor 330 or receive processor 321, which controls the elements of that module. Thus, in a preferred embodiment, control processor 320 is coupled to transmit processor 330 and receive processor 321, as shown in FIG. 3. In this manner a single control processor 320 can control the operations of a large number of modules and resources more efficiently. Transmit processor 330 controls generation of, and signal power for, pilot, synchronization, paging signals, and traffic channel signals, and their respective coupling to power controller 328. Receiver processor 321 controls searching, PN spreading codes for demodulation and monitoring received power.

As described above, a received power element 324 can be used to detect the power in a signal by monitoring the energy in the outputs of digital data receivers 316. This power information is provided to transmit power controller 328 to adjust the output power to compensate for large changes in path attenuation. Thus, these elements form part of a power control feedback loop. This power information can also be provided to receiver processor 321 or control processor 320 as desired. Part of the power control function can also be incorporated within receive processor 321.

For shared resource power control according to the present invention, gateway 102 receives information on received signal strength or signal-to-noise ratio from subscriber units 106 in communication signals. This information can be derived from the demodulated outputs of data receivers 316 by receive processors 321; alternatively, this information can be detected as occurring at predefined locations in the signals being monitored by control processor 320 or receive processors 321 and transferred to control processor 320. Control processor 320 uses this information (as described below) to control the amount of power used for shared resource signals using transmit power controllers 328.

Figure 4:
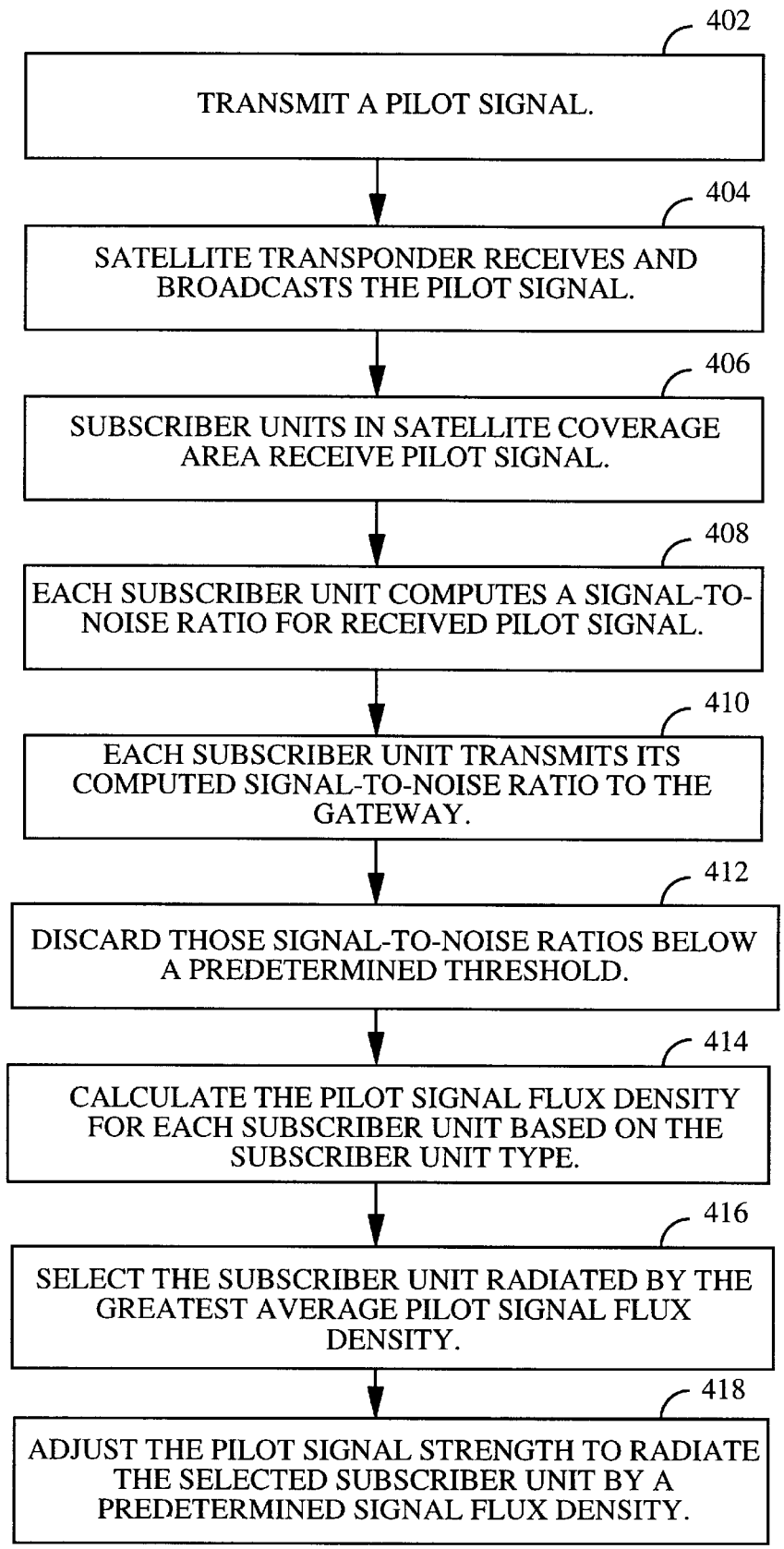
FIG. 4 is a flowchart depicting the operation of a satellite communication system according to a preferred embodiment of the present invention.

FIG. 4 is a flowchart depicting the operation of satellite communication system 100 according to a preferred embodiment of the present invention. A preferred embodiment of the present invention is described in detail with reference to FIGS. 1 and 4. Gateway 102 transmits a pilot signal as shown in a step 402. Satellite transponder 104 receives the pilot signal and broadcasts the pilot signal to subscriber units 106 as shown in a step 404. In a step 406, subscriber units 106 receive the broadcast pilot signal. Then, each subscriber unit 106 computes the signal-to-noise ratio for the received pilot signal, as shown in a step 408, and transmits this ratio to gateway 102 via satellite transponder 104, as shown in a step 410.

Due to fading, blockage or improper operation, some subscriber units 106 will suffer from inadequate signal quality (as indicated by their signal-to-noise ratios). Such subscriber units tend to request more and more forward link signal power, including the pilot signal, to overcome perceived problems with communication signal quality. Unfortunately, allowing unconstrained inputs or requests for more power from such subscribers may create an unacceptably large drain on power resources. Without restraints, a subscriber unit with a blocked or severely attenuated forward link path could drastically reduce the capacity of the communication system, without achieving a desired signal quality level. That is, for certain subscriber units, signal conditions cannot be improved by simply increasing signal power.

Because it is not advantageous to control pilot signal strength for these subscriber units 106, their signal-to-noise ratios are discarded if below a predetermined threshold, as shown in a step 412. This threshold is selected by the communication system operators based on the tradeoff between providing a given desired level of quality service to system users and the minimum system capacity to be maintained, as will be apparent to one skilled in the relevant art. For those subscriber units 106 having acceptable signal quality, gateway 102 calculates the pilot signal flux density radiating the subscriber units' antenna, as shown in a step 414. This calculation considers the type of subscriber unit (e.g., fixed, mobile or portable) due to their different known characteristics, such as receiver performance, antenna patterns, and path loss (distance).

To minimize the number of uncertainties involved in the calculations for pilot signal strength control, these calculations are performed for at least one subscriber unit having a clear path to satellite transponder 104. It is assumed that a subscriber unit having the greatest average pilot flux density radiating its antenna has a clear path to the satellite transponder. Therefore, in a step 416, gateway 102 selects at least one such subscriber unit 106 radiated by the greatest average pilot signal flux density. As would be apparent to one skilled in the relevant art, the averaging of flux density measurements may be performed at either the subscriber unit or the gateway. Further, the length of the averaging interval is a design choice which may vary without departing from the spirit and scope of the present invention.

However, it should be readily understood that in most systems there are generally several subscriber units that have a clear path to the satellite transponder. These units may also have similar average pilot flux densities. In this situation, several such subscriber units 106 can be selected in step 416 and their measured average signal flux densities time averaged, generally over several seconds or more, over the group of subscriber units to form the basis for adjusting the shared resource signal power.

Finally, gateway 102 adjusts the strength of the pilot signal so that the subscriber unit or units 106 selected in step 416 are radiated by a predetermined pilot signal flux density, as shown in a step 418. The pilot signal level is adjusted slowly (e.g., time scales of seconds) to compensate for variations in the path through the satellite or to conserve satellite power when all subscribers in a beam have high quality signals or are in favorable (higher gain) locations in the satellite beam. Variations in the path include changes in separation distances due to satellite motion, changes in fading characteristics of local environment (rain, foliage, and the like), changes in local terrain, and obstructions. However, these variations also include changes in the transfer characteristics of the satellite due to thermal loading, drive dependent gain and other known factors. This predetermined pilot signal flux density is set such that the clear path subscriber has sufficient margin to allow for normal variation in the signal due to high-K Ricean fading, specular reflection, minor path blockage and satellite beam rolloff (that is, higher attenuation near beam edges). As will be apparent to one skilled in the relevant art, the method of the present invention could be extended to compensate for beam rolloff and path loss differences if the subscriber's location is known.

The present invention works well in all loading conditions, from heavily loaded (i.e., the system has many subscribers) to lightly loaded (i.e., the system has few subscribers). Because the amount of power available on satellite transponder 104 for signal transmission is limited, the gateway must balance quality of service with subscriber capacity. The present invention permits the most accurate pilot signal strength control when the system is heavily loaded due to the large number of measurements available. Conversely, the present invention is least accurate when the system is lightly loaded due to the small number of measurements available. Fortunately, it is when the system is heavily loaded that accurate control is most desirable to permit the gateway to trade off quality of service for additional system capacity; this may be accomplished, for example, by reducing pilot signal power and increasing subscriber or traffic signal power. Conversely, when the system is lightly loaded, the gateway can afford to add margin to the pilot signal in order to improve quality of service. The distributed pilot signal measurement of the present invention is also able to detect areas of high interference due to traffic in a neighboring gateway or competing system. The gateway can increase pilot signal power to maintain quality of service in these situations. Thus, the present invention works well in any of these situations.

As a further feature of the present invention, the concept of the present invention can be extended to estimate the power consumption of a pilot signal on the satellite statistically. For example, the pilot signal measurement of the subscriber unit can be converted to a flux density, as described above, and then to a measurement of pilot signal power consumed at the satellite if the subscriber type, satellite antenna pattern and subscriber position are known. The largest calculated RF pilot signal power at the satellite is then the pilot signal power estimate for that sub-beam.

The pilot signal power estimate can be a running average of samples taken over a time scale of seconds. The accuracy of the estimate depends on the statistics of the forward satellite-to-subscriber link and the operation of the subscriber unit. Such statistics describe path loss or quality, lack of obstructions, receiver characteristics, type of interference typically experienced, and the like. The presence of well-controlled fixed subscriber units in the system reduces the uncertainty of the estimate because such subscriber units do not suffer many of the signal variations that a mobile or portable subscriber unit does. The accuracy of the estimate also depends on knowledge of the interference received by each subscriber unit.

As a further feature of the present invention, this concept can be further extended to estimate the total RF power consumed on the satellite by a sub-beam. This RF power can be estimated by summing the power consumption estimates for the pilot signal and all of the traffic signals occupying the sub-beam. The power consumed by the traffic signals can be estimated because the ratio of the pilot signal gain to the traffic signal gain in the gateway modulator or power control elements determines the ratio of the pilot signal power to the traffic signal power at the satellite.

The above process can also be used in connection with other shared resource signals, such as the paging or synchronization signals discussed earlier, as will be apparent to one skilled in the relevant art. In this situation, the signal-to-noise ratios of these signals are measured by receiving subscriber units, and the result transferred back to the gateway. The information arriving from subscriber units exhibiting low quality signals is discarded to prevent excessive drain on resources. As before, the flux density of the shared resource signal is computed, and the signal strength is adjusted, to accommodate the clear path subscriber unit.

After reading the above description, it will become apparent to a person skilled in the relevant art how to implement the invention using other alternative embodiments. While various embodiments of the present invention have been described above, it should be understood that they have been presented by way of example only, and not limitation. Thus, the breadth and scope of the present invention should not be limited by any of the above-described exemplary embodiments, but should be defined only in accordance with the following claims and their equivalents.

What we claim as our invention is:

1. Apparatus for controlling the strength of a shared resource signal relayed by a satellite in a satellite communications system having a gateway transmitting the shared resource signal, a satellite transponder and at least one subscriber unit, comprising:

receiving means for receiving the shared resource signal, at each subscriber unit, via the satellite;

at least one signal strength detector at each subscriber unit for measuring a signal strength for the received shared resource signal, by measuring a signal-to-noise ratio for the received shared resource signal;

a transmitter at each subscriber unit for sending said signal strength measurement to the gateway; and a power adjustor for adjusting the power of the shared resource signal transmitted by the satellite transponder based on said signal strength measurements, comprising:

discarding means for discarding any of said signal-to-noise ratio measurements having a magnitude less than a predetermined threshold magnitude;

calculating means for calculating, for each subscriber unit, based on said signal-to-noise ratio, an average magnitude for the flux density of the shared resource signal;

selecting means for selecting at least one subscriber unit associated with a largest average magnitude; and means for adjusting the power of the shared resource signal relayed by the satellite transponder to radiate the antenna of said at least one selected subscriber unit with a predetermined shared resource signal flux density.

2. The system of claim 1, wherein:

said selecting means selects two or more subscriber units associated with a largest average magnitude; and said means for adjusting the power of the shared resource signal does so to radiate the antenna of said two or more selected subscriber units with a predetermined shared resource signal flux density.

3. The system of claim 2, further comprising means for time averaging an average magnitude for the flux density of the shared resource signal over said two or more subscriber units.

4. In a satellite communications system having a gateway transmitting a shared resource signal, a satellite transponder for relaying the shared resource signal, and at least one subscriber unit, a method for controlling the strength of the shared resource signal relayed by the satellite transponder, comprising the steps of:

(a) receiving the shared resource signal, at each subscriber unit, via the satellite transponder;

(b) measuring, at each subscriber unit, a signal strength for the received shared resource signal based on measuring a signal-to-noise ratio for the received shared resource signal, comprising the steps of (i) discarding any of said signal-to-noise ratio measurements having a magnitude less than a predetermined threshold magnitude;

(ii) calculating, for each subscriber unit, based on said signal-to-noise ratio, an average magnitude for the flux density of the shared resource signal;

(iii) selecting at least one subscriber unit associated with a largest average magnitude;

(c) sending said signal strength measurements to the gateway; and (d) adjusting the power of the shared resource signal transmitted by the satellite transponder to radiate the antenna of said at least one selected subscriber unit with a predetermined shared resource signal flux density.

5. The method of claim 4, further comprising:

selecting two or more subscriber units associated with a largest average magnitude; and adjusting the power of the shared resource signal to radiate the antenna of said two or more selected subscriber units with a predetermined shared resource signal flux density.

6. The system of claim 5, further comprising the step of time averaging an average magnitude for the flux density of the shared resource signal over said two or more subscriber units.

* * * * *